(12) United States Patent
Braun

(10) Patent No.: US 6,662,622 B2
(45) Date of Patent: Dec. 16, 2003

(54) METHOD AND DEVICE FOR COMPENSATING THE OFFSET OF A PRESSURE VALUE

(75) Inventor: Thomas Braun, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 10/034,136

(22) Filed: Dec. 26, 2001

(65) Prior Publication Data

US 2002/0136641 A1 Sep. 26, 2002

(30) Foreign Application Priority Data

Dec. 23, 2000 (DE) .......................................... 100 65 022

(51) Int. Cl.$^7$ ............................................. G01L 27/00
(52) U.S. Cl. ......................................................... 73/1.57
(58) Field of Search .................................. 73/1.57, 1.58, 73/1.59, 1.61, 1.62, 1.63, 1.64

(56) References Cited

U.S. PATENT DOCUMENTS

| 4,744,244 | A | * | 5/1988 | Tanaka .......................... 73/115 |
| 4,815,313 | A | * | 3/1989 | Beard ............................ 73/4 R |
| 4,817,022 | A | * | 3/1989 | Jornod et al. .................. 73/4 R |
| 5,304,941 | A | | 4/1994 | Tateishi |
| 5,365,768 | A | * | 11/1994 | Suzuki et al. .................. 73/1 R |
| 5,457,631 | A | * | 10/1995 | Momose ................. 364/424.05 |
| 5,460,183 | A | * | 10/1995 | Raynes et al. ............... 128/673 |
| 6,109,702 | A | * | 8/2000 | Horn et al. ...................... 303/7 |
| 6,280,003 | B1 | * | 8/2001 | Oshiro et al. .............. 303/9.62 |
| 6,325,469 | B1 | * | 12/2001 | Carson et al. .............. 303/140 |
| 2003/0004625 | A1 | * | 1/2003 | Kachel et al. |

FOREIGN PATENT DOCUMENTS

| DE | 199 14 403 | 10/2000 |
| EP | 0 758 739 | 2/1997 |
| JP | 11091549 | 4/1999 |

* cited by examiner

Primary Examiner—Hezron Williams
Assistant Examiner—C D Garber
(74) Attorney, Agent, or Firm—Kenyon & Kenyon

(57) ABSTRACT

A method for compensating the offset of a pressure value having the steps: detecting a pressure value, lowpass filtering of the pressure value, storing the lowpass filtered pressure value as an offset value, the lowpass filtered pressure value being stored as an offset value if at least the condition is present that a logical signal has or assumes a first value and a substitute value is stored as an offset value if the logical signal has or assumes a second value. Also described herein is a device for compensating the offset of a pressure value.

13 Claims, 2 Drawing Sheets

METHOD AND DEVICE FOR COMPENSATING THE OFFSET OF A PRESSURE VALUE

FIELD OF THE INVENTION

The present invention relates to a method for compensating the offset of a pressure value having the steps: detecting a pressure value, lowpass filtering of the pressure value and storing the lowpass filtered pressure value as an offset value. In addition, the present invention relates to a device for compensating the offset of a pressure value with means to detect a pressure value, means to lowpass filter the pressure value and means to store the lowpass filtered pressure value as an offset value.

BACKGROUND INFORMATION

In numerous systems to control vehicle dynamics, it is necessary to precisely determine the pressure in the braking system. For example, in the electronic stability program (ESP), the driving state of the car is monitored in short time intervals, for example, 25 times a second. Specific brake interventions in each individual wheel and possibly a reduction of the engine speed stabilizes the vehicle and returns it to the lane. In an understeered curve, for example, the vehicle breaks away to the outside. The electronic stability program (ESP) brakes the wheel to the inside of the curve before breakaway and reduces the engine power. As a result, the car is held in the curve.

Since it is highly important to precisely know the pressure in the braking system so that effective interventions in the brakes can be made as a function of the pressure, it is appropriate to determine the offset value of the brake sensor signal as precisely as possible. It is possible in this manner to attain a high control accuracy, and if a pressure value exceeds a maximum magnitude, it is possible to recognize an incorrect pressure value. In determining the offset, it must be ensured that an increased pressure value cannot be caused either internally, e.g., through the action of the supply pump or the return pump or externally by a braking intention of the driver, which is recognized via the brake pedal. Only in these cases may an offset compensation take place, since otherwise an increased pressure sensor signal will be present when, for example, the brake pedal is pressed, the increase not arising due to an increased offset related to a pressure sensor or line.

A particular problem in recognizing the conditions for a permitted offset compensation is the timely recognition of the driver's braking intention. The primary reason for this is that in some motor vehicles, in particular due to elasticities in the pedal system, the brake light switch is not set until a pressure value corresponding to the braking intention is already present when the brake pedal is pressed with fast, highly dynamic force, in particular in panic braking. The setting of the brake light switch, which in many systems is used as an indicator of the braking intention, may, for example, occur with a 20 to 60 ms delay.

The pressure value determined at the time the brake light switch signal occurs does not then correspond to the actual offset value, or it is already above the cutoff threshold for fault detection. In existing logics, lowpass filtering of the pressure signal is carried out permanently if the acceptance conditions driver is not pressing the brake pedal,
the supply or return pumps are not activated or no longer running on,
no undervoltage in the system,
no residual pressure in the system
were valid for a specific period of time. Due to the aforementioned delayed setting of the brake light switch, the first acceptance condition, according to which the driver is not pressing the brake pedal, is violated. Consequently, a reliable offset compensation can no longer occur.

SUMMARY OF THE INVENTION

The present invention builds on the method according to the definition of the species in that the lowpass filtered pressure value is stored as an offset value if at least the condition is present that a logical signal has or assumes a first value and that a substitute value is stored as an offset value if the logical signal has or assumes a second value. The result of this is that a new lowpass filtered pressure value is stored as an offset value only if a specific condition is present. This condition is preferably present if the driver has not shown a braking intention by suddenly pressing the brake pedal, for example. If, however, such a braking intention is present, meaning that the logical signal has a second value it must be assumed, for reasons of safety, that the pressure in the system and accordingly the lowpass filtered pressure value have already assumed an increased value. Consequently, the lowpass filtered pressure value is not stored as an offset value in the event that the logical signal has a second value. Rather, a substitute value is used. Offset compensation is thus frozen during a time in which a braking intention is present. In times when there is no braking intention, offset compensation then takes place continuously.

It is particularly advantageous that the logical signal has assumed or assumes the first value if a brake light switch is not being set or is not set and that the logical signal has assumed or assumes the second value if a brake light is being set or is set. The brake light switch signal is thus used as a criterion for the presence of a braking intention by the driver. If the brake light switch is set, there is a high probability of an increased pressure in the braking system caused by the braking intention. Consequently, no offset compensation is carried out.

It is a particular advantage that a query of the logical signal takes place in a time-slot pattern, which has sequential time intervals, that the lowpass filtered pressure value of the preceding time interval is stored as an offset value if the logical signal has assumed or assumes the first value in the present time interval, and that the offset value of the penultimate time interval as a substitute value is stored as an offset value if the logical signal has assumed or assumes the second value in the present time interval. The time-slot pattern makes it possible to use offset values stored in the past as substitute values. This ensures that the offset value will not deviate excessively from the actual offset value even if the offset value of the penultimate time interval is stored as a substitute value. Consequently, a precision, which is consistent with a high control accuracy in the ESP system, is made possible.

It is advantageous that the logical signal can assume two different values, that the first value is FALSE and that the second value is TRUE. A binary logical signal can be processed in digital circuits in a simple manner.

It is useful that the lowpass filtered pressure value is stored as an offset value if, in addition to the condition that the logical signal has or assumes a first value, additional conditions are present. These additional conditions are associated with the fact that no influence may be exercised on the braking system that is contrary to a precise offset compensation.

For example, it is advantageous in this connection that the additional conditions are that the supply or return pumps are not activated or are not running on and that there is no undervoltage or there is no residual pressure in the system. All these conditions would prevent the precise determination of an offset value so that it is useful to include the consideration of these conditions in deciding if offset compensation should take place or not.

It is useful if the time intervals of the time-slot pattern have a length of approximately 200 ms. Since a typical delay between a quick pressing of the brake pedal and the setting of the brake light switch can range, for example, between 20 and 60 ms, a time-slot pattern having a length of 200 ms is adequate to supply the suitable values for the offset value storage.

It is useful that the offset value is stored in an EEPROM. An EEPROM is a memory chip that is adequate to store the offset values permanently, it being nonetheless possible to change the contents of the memory by electrical means using the advantageous time cycles.

The present invention builds on the device according to the definition of the species in that the lowpass filtered pressure value is stored as an offset value if at least the condition is present that a logical signal has a first value or assumes it and that a substitute value is stored as an offset value if the logical signal has or assumes a second value. The result of this is that a new lowpass filtered pressure value is stored as an offset value only if a specific condition is present. This condition is preferably present if the driver has not shown a braking intention by suddenly pressing the brake pedal, for example. If, however, such a braking intention is present, meaning that the logical signal has a second value, for reasons of safety, it must be assumed that the pressure in the system and accordingly the lowpass filtered pressure value have already assumed an increased value. Consequently, the lowpass filtered pressure value is not stored as an offset value in the event that the logical signal has a second value. Rather, a substitute value is used. The offset compensation is thus frozen during a time in which a braking intention is present. In times when there is no braking intention, offset compensation takes place continuously.

It is particularly advantageous if an EEPROM is used to store the offset value. An EEPROM is a memory chip that is adequate to store the offset values permanently, it being nonetheless possible to change the contents of the memory by electrical means using the advantageous time cycles.

It is moreover useful that a timer is provided and that the contents of the EEPROM are updated in the intervals specified by the timer. The time-slot pattern allows using previously stored offset values as substitute values. This ensures that the offset value will not deviate excessively from the actual offset value even if the offset value of the penultimate time interval is stored as a substitute value. Consequently, a precision, which is consistent with a high control accuracy in the ESP system, is provided.

Usefully, the intervals specified by the timer have a length of approximately 200 ms. Since a typical delay between a quick pressing of the brake pedal and the setting of the brake light switch can range, for example, between 20 and 60 ms, a time-slot pattern having a length of 200 ms is adequate to supply the suitable values for the offset value storage.

Preferably, means are provided to determine the states of the supply pump or of the return pump. This makes it possible to consider the named states in deciding if offset compensation should take place.

The present invention is based on the knowledge that it is possible to freeze the compensation of the pressure offset values under specific conditions. In particular, such freezing of the offset compensation takes place if a driver's braking intention is recognized through the setting of the brake light switch. It must then be assumed that the pressure in the braking system is not adequate for offset compensation. Consequently, a substitute value is used. This substitute value for the offset is preferably an offset value present in the penultimate time interval. With typical intervals of a time-slot pattern, an offset value is thus viewed as a present offset value, which is in the order of magnitude of one-half second before the present time. This is an acceptable approximation, with which a good functioning of the safety system, an ESP system, for example, continues to be ensured.

DETAILED DESCRIPTION

Figure 1:
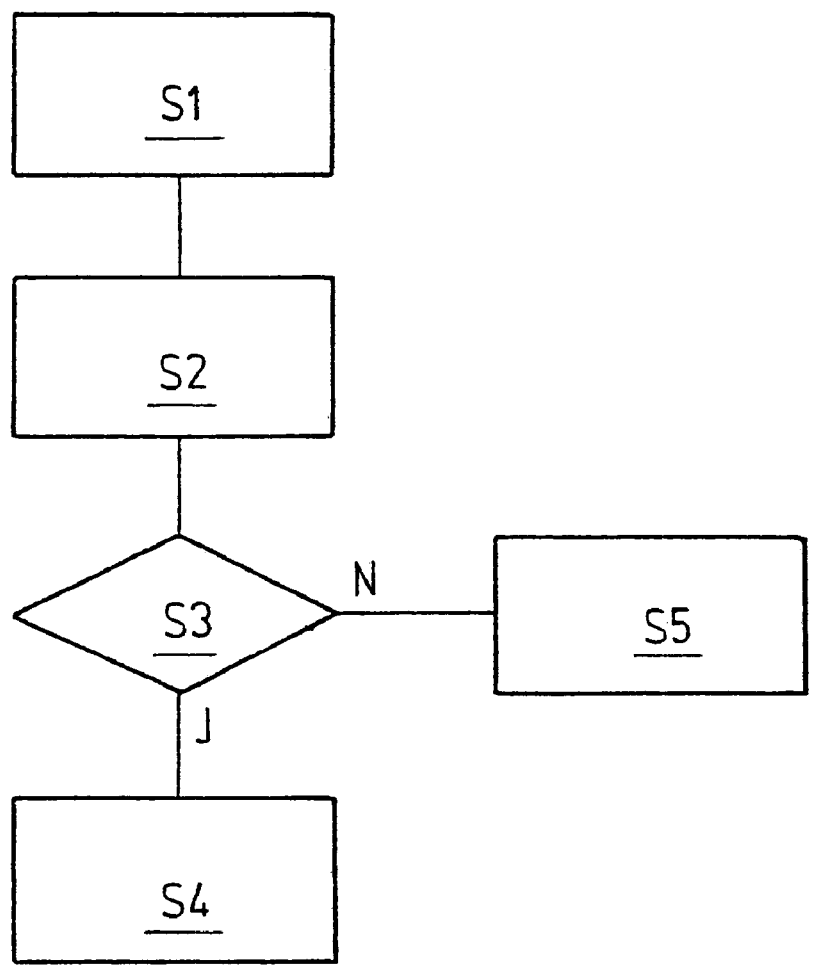
FIG. 1 shows a flowchart to explain the present invention.

FIG. 1 shows a flowchart to explain the present invention. In the flowchart, the symbols represent the following steps:

| | |
|---|---|
| S1: | Detection of a pressure value. |
| S2: | Lowpass filtering of the detected pressure value. |
| S3: | Logical brake light signal = TRUE? |
| S4: | Storing the offset value of the penultimate time interval as an offset value. |
| S5: | Storing the lowpass filtered pressure value of the previous time interval as an offset value. |

In step S1, a pressure value is detected in a braking system. This pressure value, i.e., the pressure sensor signal, is lowpass filtered in step S2. In step S3, it is checked if the brake light signal has the logical value TRUE. Moreover, additional conditions can be checked at this point of the logical flowchart, namely if a supply or return pump is activated or is running on, if an undervoltage is present in the system, or if a residual pressure is present in the system. If, for example, the condition that the brake light signal has the logical value TRUE is not present (this means that the brake light signal has the logical value FALSE), the program sequence moves to step S5. Here, the lowpass filtered pressure value of the previous time interval is stored as an offset value. Otherwise, meaning, for example, that the brake light signal has the logical value TRUE, the sequence moves to step S4; accordingly the offset value of the penultimate time interval is stored as an offset value.

Figure 2:
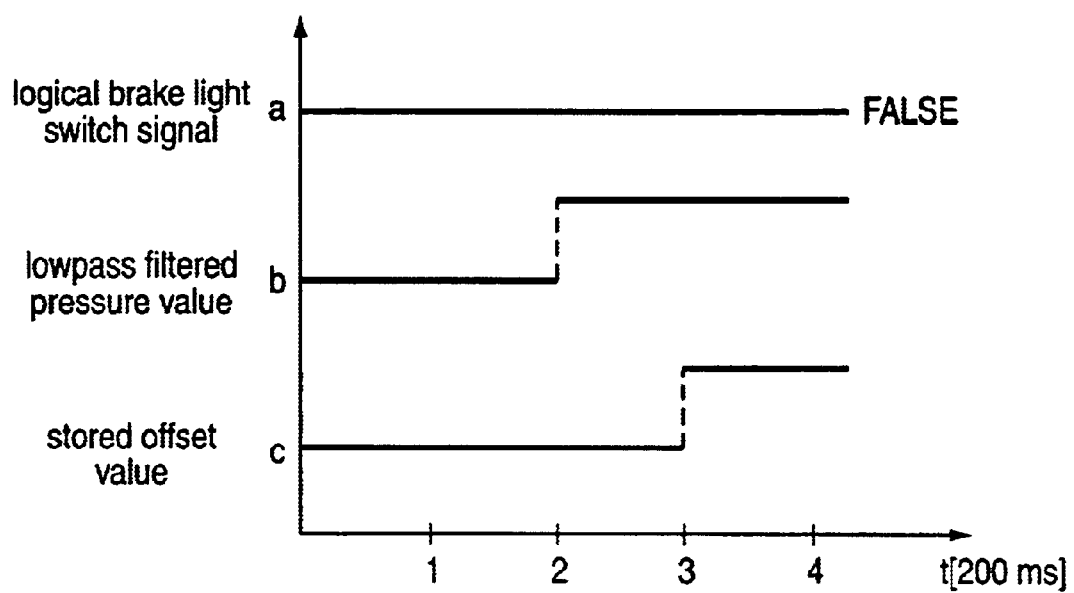
FIG. 2 shows a first timing diagram to explain the present invention.

FIG. 2 shows a timing chart in which three signals are shown as a function of time t. Time t is indicated in units of 200 ms, which corresponds to the time-slot pattern used. Signal a is the logical brake light switch signal. Signal b is the lowpass filtered pressure value. Signal c is the stored offset value. It can be recognized that lowpass filtered pressure value b assumes a different state after the second time interval. Since brake light switch signal a has assumed the logical value FALSE in the third time interval, the lowpass filtered pressure value from the third interval is stored in the fourth time interval as an offset value, which can be recognized in signal curve c.

Figure 3:
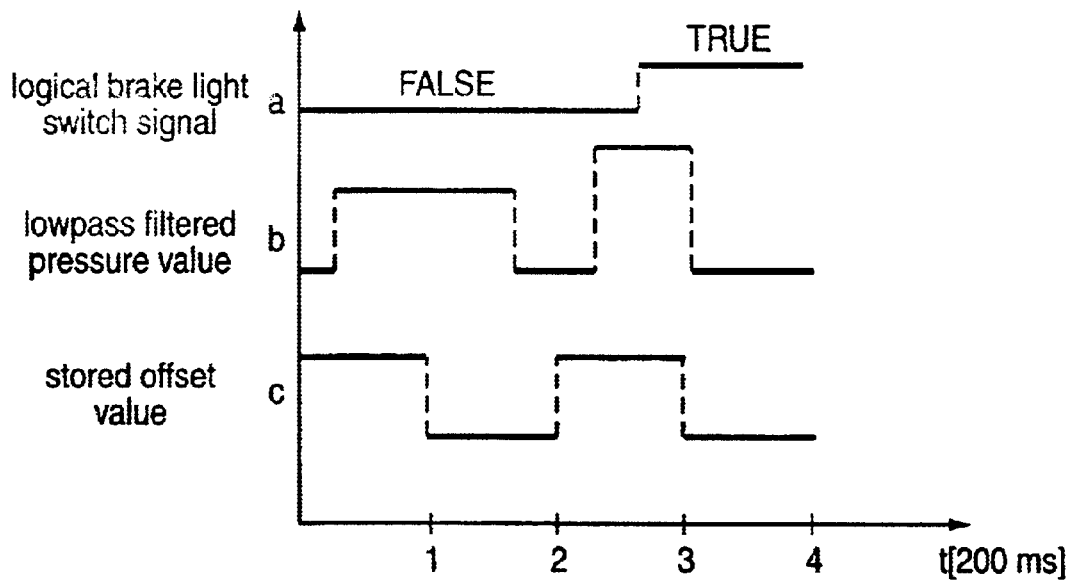
FIG. 3 shows a second timing diagram to explain the present invention.

In FIG. 3, the three signals a, b and c are also shown as a function of time. The value of 200 ms has again been selected as a time unit, which corresponds to the time-slot pattern. Brake light switch signal a changes from the logical state FALSE during the third time interval into the logical state TRUE. In the third time interval, the lowpass filtered pressure value also assumes a high value. According to the present invention, due to the change of brake light switch signal a to TRUE, the lowpass-filtered pressure value is now not taken over as a stored offset value. Rather, after the third time interval, the stored offset value of the penultimate time interval is taken over as a substitute value so that corruption of the offset compensation due to a delayed brake light switch signal is avoided.

The preceding description of the exemplary embodiments of the present invention serves only the purpose of illustration and is not intended to limit the present invention. Various changes and modifications are possible in connection with the present invention without departing from the scope of the present invention and its equivalents.

What is claimed is:

1. A method to compensate an offset of a pressure value, comprising the steps of:

detecting a pressure value;

performing a lowpass filtering of the pressure value;

storing the lowpass filtered pressure value as a first offset value if at least a logical signal is a first value; and storing a substitute value as another offset value if the logical signal is a second value.

2. The method according to claim 1, wherein:

the logical signal is the first value if a brake light switch is one of not being set and has not been set, and the logical signal is the second value if a brake light is one of being set and has been set.

3. The method according to claim 1, further comprising the steps of:

performing a query of the logical signal in a time-slot pattern that has sequential time intervals;

storing the lowpass filtered pressure value of a preceding time interval as the first offset value if the logical signal is the first value in a present time interval; and storing as the other offset value an offset value of a penultimate time interval as a substitute value if the logical signal is the second value in the present time interval.

4. The method according to claim 1, wherein:

the logical signal can assume two different values, the first value of the logical signal is FALSE, and the second value of the logical is TRUE.

5. The method according to claim 1, wherein:

the lowpass filtered pressure value is stored as the first offset value if, in addition to the logical signal being the first value, additional conditions are present.

6. The method according to claim 5, wherein:

the additional conditions are that one of a supply pump and a return pump is one of not activated and not running on and that one of there is no undervoltage and there is no residual pressure in the system.

7. The method according to claim 3, wherein:

the sequential time intervals of the time-slot pattern have a length of approximately 200 ms.

8. The method according to claim 1, wherein:

each one of the first offset value and the other offset value is stored in an EEPROM.

9. A device for compensating an offset of a pressure value, comprising:

an arrangement for detecting a pressure value;

an arrangement for performing a lowpass filtering of the pressure value; and an arrangement for storing the lowpass filtered pressure value as a first offset value if at least a logical signal is a first value, and for storing a substitute value as another offset value if the logical signal is a second value.

10. The device according to claim 9, wherein:

the arrangement for storing includes an EEPROM.

11. The device according to claim 10, further comprising:

a timer, wherein:

a content of the EEPROM is updated in intervals specified by the timer.

12. The device according to claim 11, wherein:

the intervals specified by the timer have a length of approximately 200 ms.

13. The device according to claim 9, further comprising:

an arrangement for determining a state of one of a supply pump and a return pump.

* * * * *

UNITED STATES PATENT AND TRADEMARK OFFICE
CERTIFICATE OF CORRECTION

PATENT NO. : 6,662,622 B2
DATED : December 16, 2003
INVENTOR(S) : Thomas Braun

It is certified that error appears in the above-identified patent and that said Letters Patent is hereby corrected as shown below:

Column 5,
Line 39, change "lowp ass filtered pressure" to -- lowpass filtered pressure --

Column 6,
Line 24, change "a lowp ass filtering" to -- a lowpass filtering --

Signed and Sealed this

Fifth Day of April, 2005

JON W. DUDAS
*Director of the United States Patent and Trademark Office*